(12) United States Patent
Erden et al.

(10) Patent No.: US 6,288,131 B1
(45) Date of Patent: *Sep. 11, 2001

(54) INLINE SOLID STATE POLYMERIZATION OF PET FLAKES FOR MANUFACTURING PLASTIC STRAP

(75) Inventors: Donald Van Erden, Wildwood; Gary L. Vadnais, Grayslake; Manuel C. Enriquez, Morton Grove; Karl G. Adams, Schaumburg; James P. Nelson, Naperville, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/191,744

(22) Filed: Nov. 13, 1998

Related U.S. Application Data (63) Continuation-in-part of application No. 08/794,538, filed on Feb. 3, 1997, now Pat. No. 5,886,058.

(51) Int. Cl.$^7$ ...................................... C08J 11/04
(52) U.S. Cl. ................... 521/48; 521/46.5; 525/444; 528/308.3
(58) Field of Search ................... 521/48, 46.5; 525/444; 528/308.3

(56) References Cited

U.S. PATENT DOCUMENTS

| | | |
|---|---|---|
| 3,767,601 | 10/1973 | Knox . |
| 4,022,863 | 5/1977 | Karass et al. . |
| 4,077,945 | 3/1978 | Heinze et al. . |
| 4,543,364 | * 9/1985 | Nankee .................................. 521/40 |
| 4,742,151 | 5/1988 | Tate et al. . |

OTHER PUBLICATIONS

The Role of Additives in the Solid State Polycondensation of recycled Polyethylene Terephthalate (PET), Ulrich Steiner et al., ARC '96 Technology, The Spark in Recycling, Nov. 7–8, 1996.

* cited by examiner

Primary Examiner—Patricia A. Short
(74) Attorney, Agent, or Firm—Schwartz & Weinrieb (57) ABSTRACT

A process for preparing a PET flake mixture for use in connection with the fabrication of high-performance plastic strapping comprises the steps of initially collecting post-consumer and non-post-consumer PET materials having an initially wide range of relatively low intrinsic viscosity (IV) values with a relatively low average intrinsic viscosity (IV) value, and processing the same through solid state polymerization (SSP) so as to obtain a wide range of relatively high intrinsic viscosity (IV) values with a relatively high average intrinsic viscosity (IV) value. The initially collected materials are chopped into flakes and chunks, and the chunks are flattened so as to render the remaining mixture comprised substantially entirely of flake materials or segments. This is advantageous because the flake segments, as opposed to the chunk segments, are able to be substantially increased in intrinsic viscosity (IV) values and within a relatively short period of time. The initially collected materials have intrinsic viscosity (IV) values which are within the range of 0.60–0.80 dl/g, and as high as 0.90 dl/g, and the diversity of such materials is underscored or emphasized by the fact that the difference in such intrinsic viscosity (IV) values of the initial or starting materials is at least, or greater than, 0.05 dl/g, is probably at least 0.10 dl/g, and can be within the range of 0.10–0.30 dl/g.

20 Claims, 5 Drawing Sheets

* REMOVAL THROUGH DESICCANT PROCESS OF BEPEX
* REMOVAL THROUGH CATALYTIC $O_2$ PROCESS OF BUHLER
* REMOVAL THROUGH LIME BAG
* REMOVAL THROUGH WATER SPRAY
* OPTIONAL GUARD BED FOR HCl REMOVAL

INLINE SOLID STATE POLYMERIZATION OF PET FLAKES FOR MANUFACTURING PLASTIC STRAP

CROSS-REFERENCE TO RELATED PATENT APPLICATION

This patent application is a Continuation-In-Part (CIP) Patent Application of U.S. patent application Ser. No. 08/794,538 filed on Feb. 3, 1997 in the name of Donald Van Erden et al., now U.S. Pat. No. 5,886,058, and entitled INLINE SOLID STATE POLYMERIZATION OF PET FLAKES FOR MANUFACTURING PLASTIC STRAP, and is being filed herewith under 37 CFR 1.53(b).

FIELD OF THE INVENTION

The present invention relates generally to the solid state polymerization (SSP) processing of polyethylene terephthalate (PET) material, as well as the material produced by such process, and more particularly to the solid state polymerization (SSP) processing of post-consumer and non-post-consumer polyethylene terephthalate (PET) material, especially for use in connection with the fabrication or manufacture of high-performance strapping, as well as the high-performance strapping produced by such process.

BACKGROUND OF THE INVENTION

Post-consumer polyethylene terephthalate (PET) which is primarily provided by or derived from plastic soft drink bottles, can be readily obtained from material recovery facilities. Such material, however, exhibits relatively low and heterogeneous, or a wide distribution of, intrinsic viscosity (IV) values, and in the past, this characteristic has prevented such PET materials from being directly used to produce products, such as, for example, high-performance plastic strapping, which in fact require relatively high and homogeneous intrinsic viscosity (IV) values. It was one of the discoveries of the invention disclosed within the aforenoted related U.S. patent application Ser. No. 08/794, 538 that such heterogeneity, or relatively wide distribution, of the intrinsic viscosity (IV) values of the PET material did not in fact adversely affect the production of such high-performance strapping, and the present invention further defines the intrinsic viscosity (IV) parameters or values of the PET starting materials used in connection with the processing of such PET materials into high-performance plastic strapping.

In accordance with prior art processing techniques, the PET material, whether post-consumer and/or non-post consumer material, was initially chopped into flakes and chunks, and the flakes and chunks were extruded into pellets. The chopped PET materials had a relatively low and wide range of IV values because the various soft drink bottles, for example, were manufactured by different companies using different materials exhibiting different IV values. The IV values were typically within the range of 0.60–0.80 dl/g. In accordance with such prior art processing techniques, it was further believed that in order to make a high-performance product, such as, for example, high-performance plastic strapping, from such post-consumer PET materials, it was necessary that the materials exhibit or achieve a relatively high and narrow range of IV values after the solid state processing which therefore required, as an initial step, the pelletizing of the flakes before commencement of the solid state polymerization. When the PET pellets are then subjected to solid state polymerization (SSP), the pellets would have their IV values raised and exhibit a relatively high and narrow range of IV values whereby such enhanced pellets could then be used to produce high-performance products, such as, for example, high-performance strapping.

As noted hereinabove, in accordance with the noted prior art processing techniques, the prior art solid state polymerization (SSP) of the PET materials commenced with pellets of uniform geometry. Such prior art solid state polymerization (SSP) of the pellets, however, required an inordinate amount of time, that is, approximately twelve to nineteen hours, to complete in order to produce the desired strapping, and it was not appreciated, until the invention disclosed within the aforenoted U.S. patent application Ser. No. 08/794,538, that a heterogeneous mixture of flakes and chunk-like PET materials could undergo direct solid state polymerization, without necessarily being initially pelletized, to the same or higher average IV values as those of the prior art pellets, and in a significantly faster manner, that is, upon the order of one-quarter the time required for the solid state polymerization of the pellet materials.

More specifically, it was believed that, in accordance with the teachings of the prior art, flakes with a wide distribution of IV values could not be solid stated directly and must firstly be pelletized to a state which is "suitable" for the production of high performance strapping. In this environment, the term "suitable" meant that the materials not only exhibited a relatively high average IV value, but in addition, the materials also exhibited a relatively narrow range of IV values. The solid state polymerization of the pellets was intended to result in, and did in fact result in, materials exhibiting a narrow IV value range which those skilled in the art believed was necessary in order to make a high-performance product. However, the resulting prior art strapping exhibited average IV values which were not greater than 0.90 dl/g. In contrast, and contrary to the aforenoted teachings of the prior art, it was discovered that high-performance plastic strapping fabricated in accordance with the processing techniques disclosed within the aforenoted U.S. patent application Ser. No. 08/794,538 exhibited average IV values which were greater than 0.90 dl/g. Therefore, in accordance with the teachings of the invention embodied within the aforenoted U.S. patent application Ser. No. 08/794,538, high-performance plastic strapping could be commercially manufactured in an economical manner using PET materials, having a relatively wide distribution of IV values, and as a result of undergoing solid state polymerization directly from flaked materials which do not have to be initially pelletized.

The prior art is also exemplified by the type of solid phase polymerization processing as that disclosed within Knox, U.S. Pat. No. 3,767,601, wherein the solid phase polymerization of waste PET is disclosed without initially pelletizing the same. However, again, as was true or characteristic of the aforenoted type of prior art, the waste PET film used as the starting materials in connection with the process disclosed within the Knox patent is gathered from a commercial production run of manufacturing PET film and is characterized by a relatively low and very narrow range of intrinsic viscosity (IV) values, such as, for example, 0.50–0.55 dl/g. In accordance with the teachings of the present invention, however, and contrary to the disclosure or teachings of Knox, the initial starting materials have a much wider distribution or diversity of IV values, such as, for example, within the range of 0.60–0.80 dl/g, and as high as 0.90 dl/g, and more particularly, the difference in the intrinsic viscosity (IV) values between different ones or types of starting materials is at least, or greater than, 0.05 dl/g, is probably at least 0.10 dl/g, and the differential range of intrinsic viscosity (IV) values of the starting materials can be 0.10–0.30 dl/g.

OBJECTS OF THE INVENTION

Accordingly, it is an object of the present invention to find versatile ways of reusing post-consumer and other forms of PET, and therefore, the present invention provides a new and improved inline solid state polymerization (SSP) process which increases the IV values of such PET materials such that PET flakes can be utilized for subsequent processing of the same into high-performance plastic strapping.

Another object of the present invention is to provide a new and improved solid state polymerization (SSP) process, for processing PET flakes into high-performance plastic strapping, whereby the solid state polymerization of the flakes occurs faster than similar processing of prior art pellets.

Still another object of the present invention is to provide a new and improved solid state polymerization (SSP) process, for processing PET flakes into high-performance plastic strapping, wherein, for example, entire post-consumer PET soft-drink bottles can be utilized, including the relatively thick or chunk-like neck portions thereof, as a result of such neck portions being rolled into thinner flake-like portions which effectively improves the geometry of such portions so as to undergo more effective solid state polymerization thereof.

SUMMARY OF THE INVENTION

The foregoing and other objectives are achieved in accordance with the teachings of the present invention through the provision of a process of directly converting post-consumer PET flake materials to materials having relatively high average intrinsic viscosity (IV) values whereby such resulting materials are useful in connection with the fabrication of particularly desirable products, such as, for example, high-performance strapping. High performance strapping exhibits increased weld strength. Weld strength is critically important in view of the fact that weld strength is often the weak link in strapping products. A weld strength value which is equal to 50% of the tensile strength of the strapping is considered normal for conventional or prior art high-performance strapping. As a result of the processing techniques of the present invention, however, the tensile strength, and accordingly a proportional percentage of the weld strength, of the strapping produced has been able to be increased approximately 30% with respect to the conventional or prior art high-performance strapping. Generally, when the tensile strength is increased, percentage joint strength decreases, however, the process of the present invention not only retains joint strength, but actually increases percentage joint strength. The process of the present invention not only produces strapping which exhibits at least a 50% joint strength value, but can produce strapping which exhibits a joint strength value as high as 80%. These characteristics of the manufactured strapping help clarify what is meant in the art as "high performance" strapping.

In accordance with the process of the present invention, the inventive process begins by obtaining post-consumer and non-post-consumer material containing PET. These materials may be obtained, for example, from strapping or material recovery facilities, and the materials have a relatively wide distribution or diversity of initial IV values, such as, for example, within the range of 0.60 dl/g to 0.80 dl/g, and as high as 0.90 dl/g, and more particularly, the difference in the intrinsic viscosity (IV) values between different ones or types of starting materials is at least, or greater than, 0.05 dl/g, is probably at least 0.10 dl/g, and can be within the range of 0.10–0.30 dl/g. The PET materials usually contain a variety of impurities, such as, for example, PVC.

The PVC and PET materials are then chopped into a heterogeneous mixture of flakes and chunks, and the PET and PVC flakes and chunks are preheated within a dryer or preheater so as to undergo a preheating stage at a temperature level of approximately 270–350° F. and for a time period of approximately 3.5–4 hours. As a result of such preheating process step, the PET materials are dried in view of molecular water having been removed therefrom, and the PVC flakes and chunks are browned. The PET and browned PVC materials are discharged from the dryer or preheater and conveyed through a pair of flattening rolls which generally do not disturb or affect the flake pieces but flatten the chunk pieces into a more flake-like state. The browned PVC flakes or flake-like chunks are removed through means of suitable color-sensitive camera apparatus or equipment. Subsequently, the PET flakes, from which the PVC flakes have now been removed, are now ready to enter the first stage of solid state polymerization, and accordingly, the PET flakes are placed into a hopper and heated in the absence of oxygen and in the presence of nitrogen until they reach a temperature level of between 420° F. and 430° F.

After undergoing the first stage of solid state polymerization for approximately one hour or more, the flakes are ready to enter the second stage of solid state polymerization, and accordingly, the heated flake mixture is removed from the hopper and placed within a bin in the absence of oxygen and in the presence of nitrogen. The flakes are heated to a temperature level of approximately 425° F. and remain in the bin for a time period of approximately four hours.

Once the flakes have completed the first and second stages of solid state polymerization, the IV value of the resulting PET material has been increased to at least 0.90 dl/g, and to as high as 1.50 dl/g, with the average IV value being approximately 0.95 dl/g. The PET flakes, having the enhanced IV values, can then be extruded through a suitable extruder so as to produce high-performance strapping. The strapping produced by means of the process of the present invention, that is, utilizing PET flakes which have been directly subjected to solid state polymerization, which have not necessarily been subjected to intermediate pelletization, and which have resulted in material having an enhanced average IV value of approximately 0.95 dl/g and a wide distribution of IV values within the range of 0.90 dl/g to 1.50 dl/g, is therefore able to comprise high-performance strapping which exhibits good tensile strength, weld strength, and joint strength characteristics. In addition, the solid state polymerization process to which the flakes of the present invention are subjected only requires a fractional amount of time that was previously required in connection with the prior art processing of the PET material pellets. As a result of such faster processing times experienced or facilitated by the present invention, increased residence times of the flakes within the SSP processing may be implemented so as to economically produce materials of even greater IV values and performance characteristics, that is, the tensile and weld strength properties thereof.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1A:
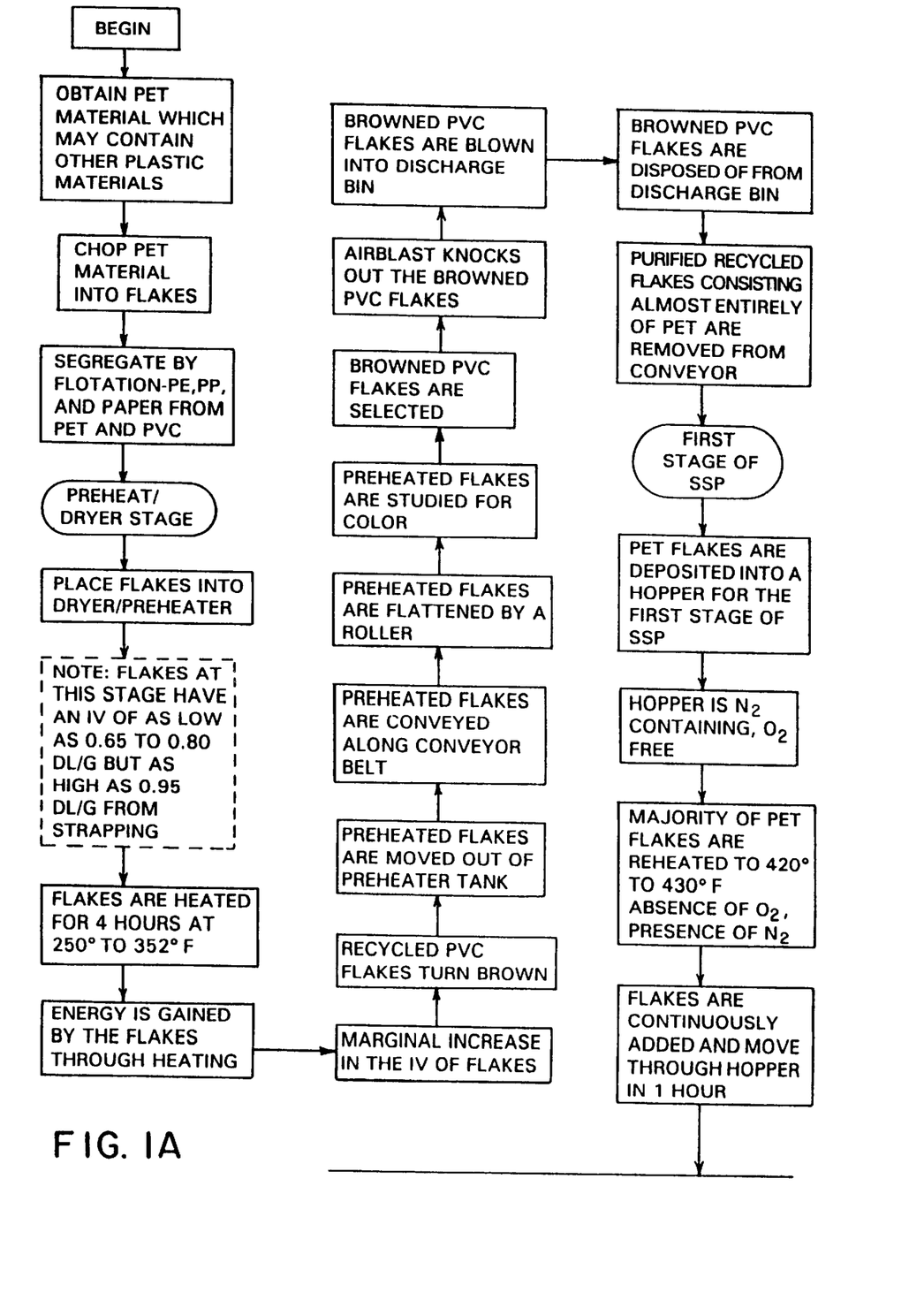
FIGS. 1A–1C comprise a flow chart showing the various steps of the PET flake process of the present invention.

Referring now to the drawings, and more particularly to FIG. 1A thereof, post-consumer and non-post-consumer polyethylene terephthalate (PET) materials are collected from any one or more of various different sources, including, for example, material recovery facilities, and the materials are co-mingled into a heterogeneous mixture. In addition to containing or comprising polyethylene terephthalate (PET) materials, the mixture also usually contains various other materials, or impurities such as, for example, PVC, polypropylene, polyethylene, paper, and the like, which are not desirable for use within the solid state polymerization (SSP) processing of the PET materials in accordance with the present invention. Accordingly, the heterogeneous mixture of the majority post-consumer PET materials and the minority post-consumer PVC materials and other impurities are firstly chopped into flakes and chunks so as to render such constituents or components suitable for further processing in accordance with the subsequent processing steps characteristic of the present invention. The flakes and chunks are respectively derived, for example, from wall portions and neck portions of plastic soft drink bottles, with the neck or chunk portions being thicker and denser than the wall or flake portions. The materials are then subjected to a flotation segregation process which serves to separate the polyethylene, polypropylene, and any paper material from the PET materials as a result of bulk density techniques whereby the polyethylene, polypropylene, and paper material components float to the top of the flotation apparatus while the PET materials sink to the bottom of the flotation apparatus.

Figure 3:
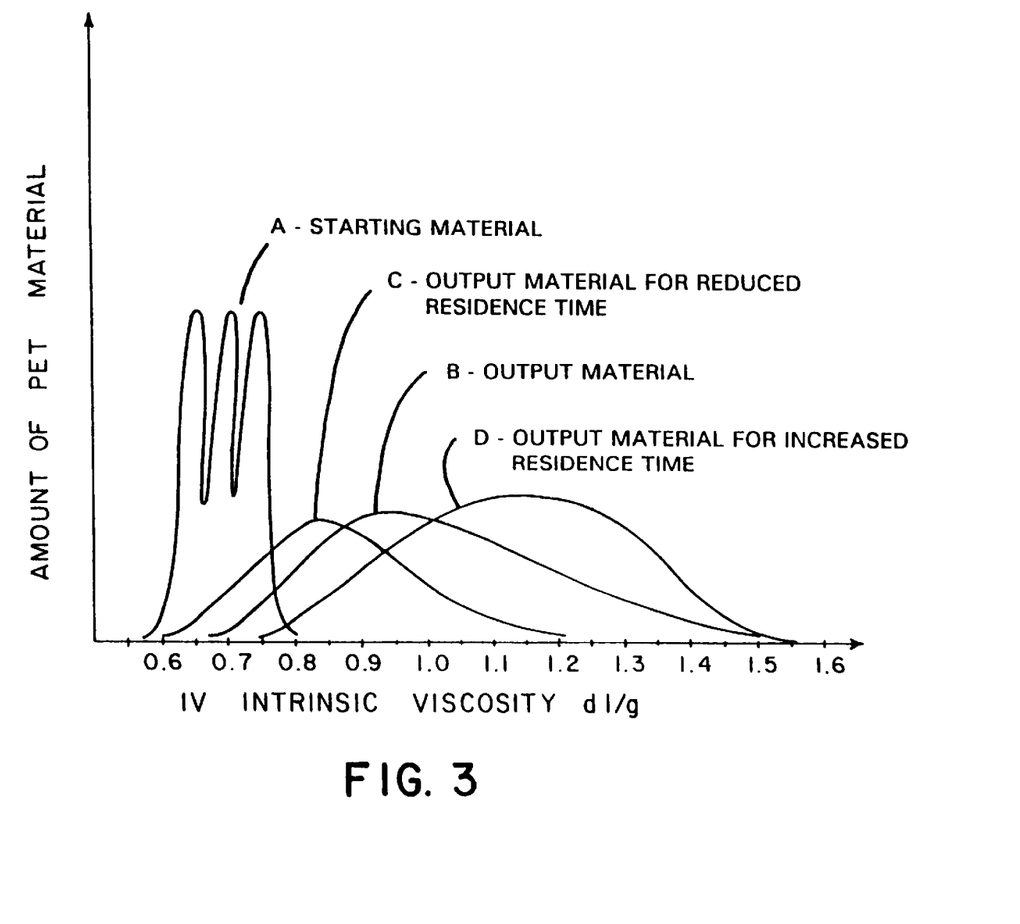
FIG. 3 is a graph showing the relationship between the amount of PET material and the intrinsic viscosity (IV) for a starting material and various resulting materials produced under different conditions.

The PET materials prepared in accordance with the foregoing process steps initially have a substantially wide intrinsic viscosity (IV) value range which in fact extends from a relatively low IV value of approximately 0.60 dl/g to a relatively high IV value of approximately 0.80 dl/g, with the average initial IV value being approximately 0.70 dl/g as shown by curve A in FIG. 3. The reason for this relatively wide range of IV values is due, for example, to the fact that different plastic soft drink bottles are manufactured by different bottle manufacturers using different plastic materials. It is also to be appreciated still further that the initial mixture of PET materials can have IV values which may differ from those noted hereinabove depending upon the particular source of the materials. It is possible, for example, to use recycled materials, other than plastic soft drink bottles, which are characterized by relatively low IV values, or alternatively, to use recycled high performance strapping made either by prior art processes or by the process of the present invention whereby such strapping may exhibit average IV values of 0.90 dl/g or higher. In any case, it is to be appreciated that the initial materials can be, and usually are, quite diverse and comprise materials wherein the intrinsic viscosity (IV) values differ from each other by at least 0.05 dl/g and can differ in IV values by as much as, at least, or up to, 0.10–0.30 dl/g, or in other words, between 0.10 and 0.30 dl/g. It is to be appreciated further that in accordance with the various teachings of the present invention, it is possible to produce, from a heterogeneous mixture having a relatively wide or broad distribution of IV values of, for example, 0.60–0.80 dl/g and as high as 0.90 dl/g, and characterized further by a relatively low average IV value of, for example, 0.70 dl/g, resultant materials which have a relatively wide or broad distribution of IV values, such as, for example 0.70 dl/g to 1.50 dl/g and characterized by a relatively high average IV value of, for example, 0.95 dl/g as illustrated by means of curve B shown in FIG. 3.

The precise curves and material results or characteristics will of course depend upon the initial input material characteristics and the particular processing parameters, and accordingly, curves C and D of FIG. 3 illustrate other resultant materials having relatively wide distributions of IV values with, however, different average IV values, the different materials being produced as a result of different process residence times. It is therefore to be appreciated that in accordance with the processing techniques and parameters characteristic of the present invention, resulting solid state polymerized (SSP) material, having an average IV value of, for example, approximately 0.80–0.85 dl/g and useful or suitable for fabricating high-performance strapping exhibiting currently or conventionally acceptable quality and performance characteristics, can in fact be fabricated merely by reducing the residence time of the materials within the process. Accordingly, still further, and quite advantageously, high-performance strapping exhibiting conventionally acceptable average IV values, and tensile strength and weld strength characteristics, can be manufactured faster and more economically when ultrahigh-performance strapping, which can also be manufactured in accordance with the various processing techniques characteristic of the present invention and having an average IV value of, for example, 1.15 dl/g, are not in fact required for particular applications.

Accordingly, with continued reference being made to FIG. 1A, after the polypropylene, polyethylene, and paper materials or impurities have been segregated from the charge or batch materials, the PET and PVC flake materials are placed within a suitable preheater tank or dryer so as to undergo a pre-heating stage. In the preheater tank or dryer, the PET and PVC flake materials are heated to a temperature level of approximately 270° F.–352° F. and for a time period of approximately 3.5 to 4.0 hours. The purpose of the pre-heating stage is essentially to dry the flake materials so as to remove molecular water therefrom, and to also brown the PVC materials. The preheated materials, including the browned PVC materials, are then removed from the preheater tank or dryer and conveyed toward a pair of flattening rolls.

The flattening rolls permit the wall flake portions to pass through the nip of the flattening rolls in a generally undisturbed state, however, the neck chunk portions are flattened. By flattening the relatively thick neck chunk portions, the geometry of such portions is altered such that such flattened neck chunk portions now resemble the wall flake portions. When the rolled or flattened neck chunk portions are subsequently heated to a solid stating temperature of approximately 420–430° F., it has been found that they tend to reform themselves back into their original shape or configuration, however, as a result of the processing of such materials in accordance with the teachings of the present invention, when such materials are heated to approximately 420–430° F. during the solid stating thereof, and when they tend to reform themselves back to their original shape or configuration, they do so with many cracks and splits being formed within such material pieces. These cracks and splits therefore reduce the distance from any point within the piece to a surface region thereof, and therefore, these reformed, cracked or split, originally chunk-type neck pieces solid state substantially like the original flake-type wall pieces.

Figure 1B:
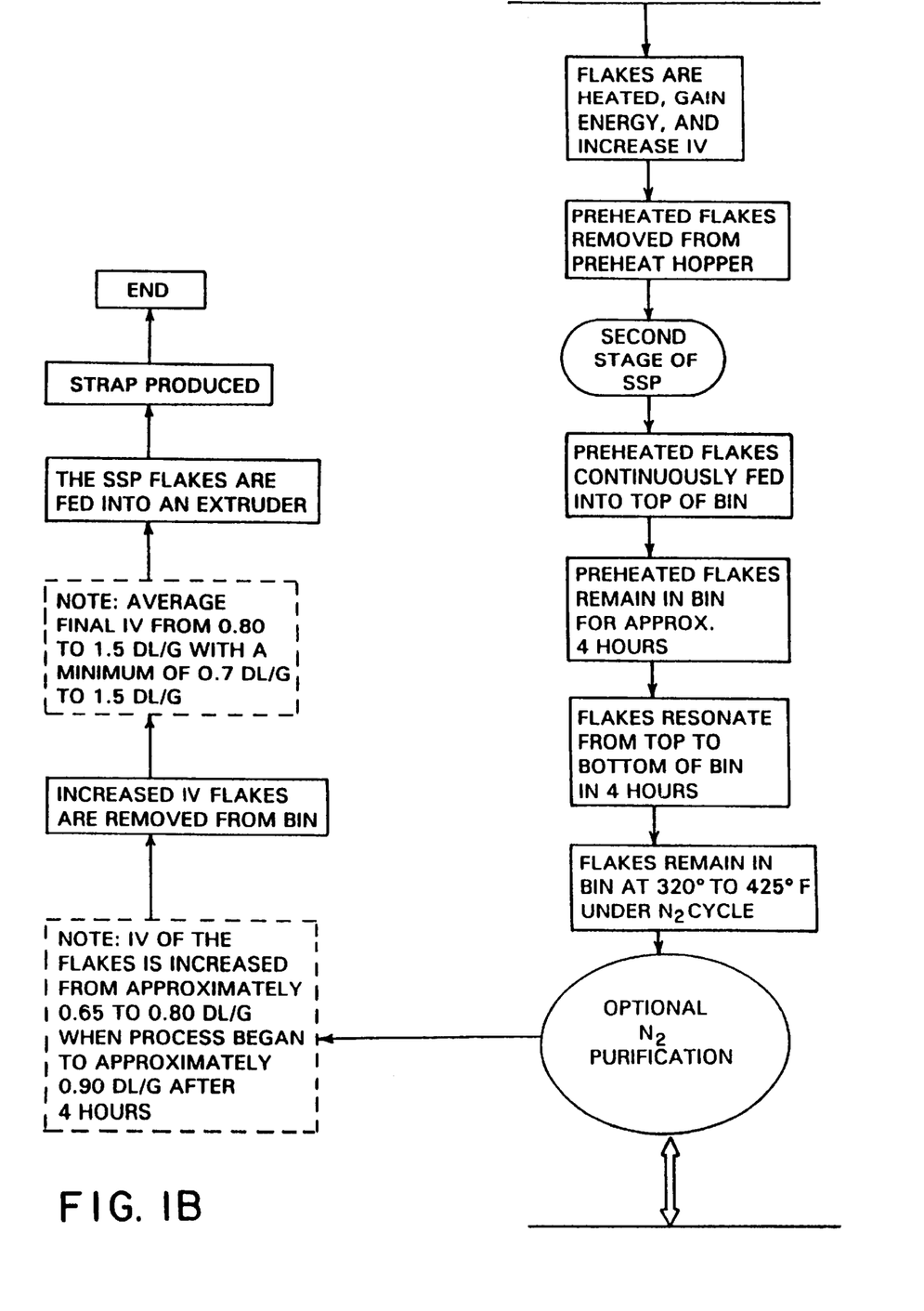
Figure 1C:
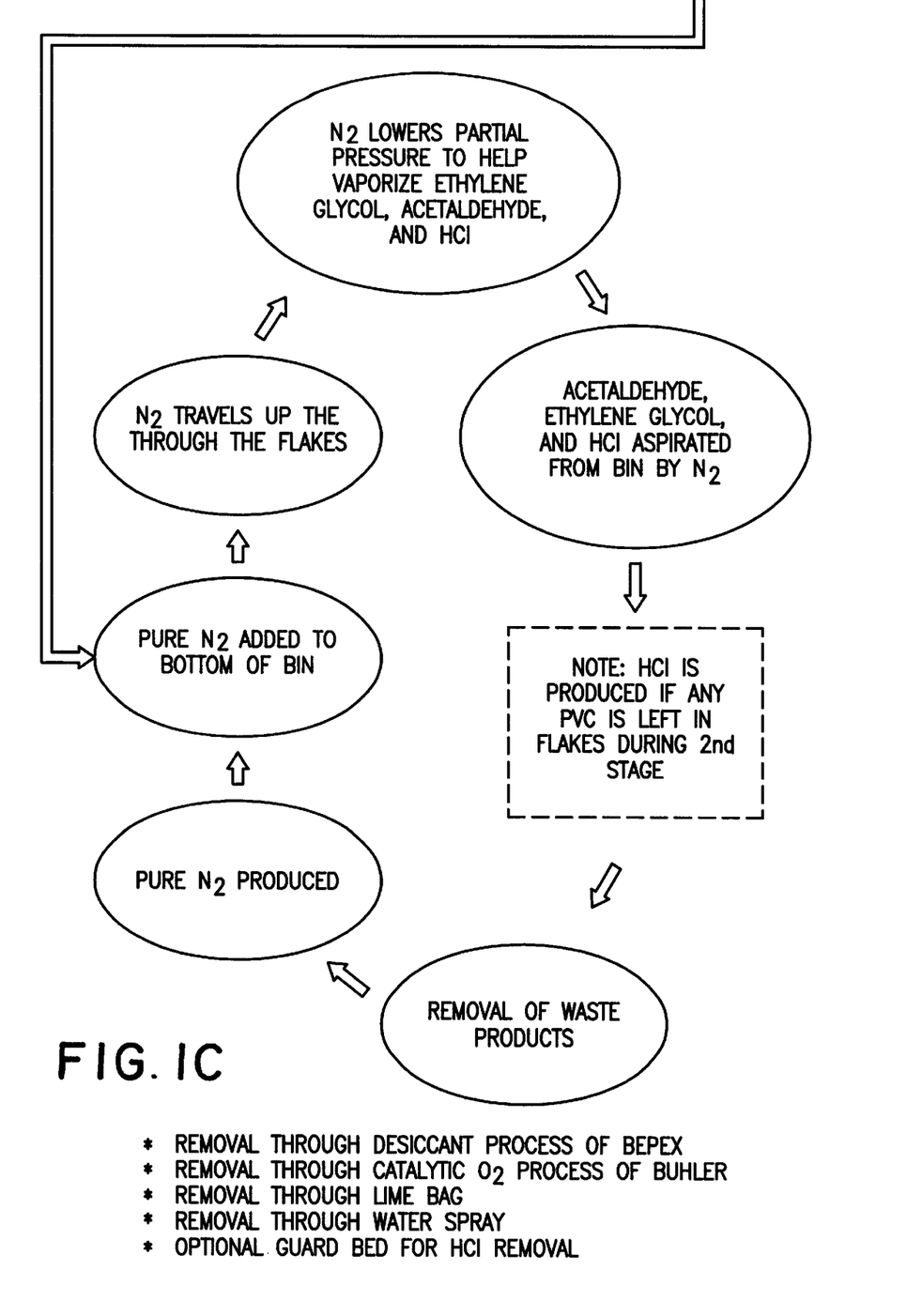

After flattening, the flakes and flattened chunks are conveyed along a conveyor belt and are studied by highly sensitive cameras for color. The cameras are able to isolate the browned PVC flakes. The positions of the browned PVC flakes are then identified and an air blast or other suitable means are actuated so as to discharge the browned PVC flakes from the conveyor belt and into a discharge bin. At this point in the process, the material has been purified of the unwanted PVC flakes and consists of substantially solely PET flakes. The browned PVC flakes are weighed and correlated with the weight of the preheated PET flakes, as well as compared with the weight of the entire original sample of PET and PVC flakes that went through the preheater, whereby it can be determined if substantially all of the PVC material has been removed from the batch of PET flake materials to be processed further in accordance with the solid stating techniques of the present invention.

It is important to remove the PVC flakes from the batch of materials to be solid stated so as to prevent the production of hydrochloric acid (HCl) which tends to damage the equipment or apparatus used in connection with the solid state polymerization processing. In addition, if PVC is present within the materials undergoing the solid state polymerization, brown streaks will be present within the extruded film or material which then, in turn, appears within the produced strapping. Still further, the presence of PVC material may also lead to clogging of the melt filtration components of the extruder, and PVC also tends to lower the intrinsic viscosity (IV) values of the flakes undergoing the solid state polymerization.

The PET flakes are now ready for the first stage of the solid state polymerization process. It is known that the different thickness characteristics or dimensions of different products or materials affects the time required to solid state the materials to a predetermined IV value, and as noted in the aforenoted related parent patent application, the relatively thicker neck or chunk portions are slower to solid state than the relatively thinner wall or flake portions. The first stage of solid state polymerization comprises increasing the temperature of the charge or batch of PET materials, and in view of the fact that the chunk portions or materials have been previously, in effect, converted to flake portions or materials as a result of the flattening or rolling process, the time required for processing the wall or flake portions or materials is relatively short whereby enhanced processing efficiency, comprising the processing flow-through of the flake or wall portions of the materials, is able to be achieved. More particularly, the PET flakes are deposited within a hopper which comprises an oxygen-free environment within which nitrogen gas is disbursed. The temperature of the materials is elevated to approximately 420° F.–430° F. The flakes are continuously deposited into the hopper, and they continuously move through the hopper from the top of the hopper to the bottom of the hopper, during which time the materials experience a slight increase in their IV values. In accordance with one embodiment or example of practicing the present invention process, this first stage of solid state polymerization takes approximately one hour.

The heated PET flakes are now ready for the second stage of solid state polymerization. Accordingly, the flakes are removed from the preheating hopper and are continuously deposited into a bin. The heated PET flakes are retained within the bin for a processing time period of approximately four hours during which time the flakes travel from the top of the bin to the bottom of the bin, and the temperature level within the bin is in the range of 380° F. to 425° F. in accordance with a nitrogen cycle which will be explained more fully hereinafter. As a result of such processing, the intrinsic viscosity (IV) value of the PET flakes, which was initially within the range of approximately 0.60 dl/g to 0.80 dl/g, but could be as high as 0.90 dl/g, increases substantially to an average IV value of approximately 0.95 dl/g and with a wide distribution of IV values ranging from approximately 0.70 dl/g to 1.5 dl/g as shown, for example, by means of curve B in FIG. 3. The heated, high intrinsic viscosity flakes may then be removed from the bin and fed directly to an extruder from which high-performance strapping, having an IV value of at least 0.90 dl/g, may be manufactured.

During the solid state polymerization process, various volatile organic compounds are formed. For example, ethylene glycol is a by-product generated from the polyester, acetaldehyde is a decomposition by-product of ethylene glycol, and hydrochloric acid (HCl) is generated as a result of the heating of the polyvinyl chloride (PVC). The nitrogen cycle is utilized within the second stage of solid state polymerization so as to, in effect, rid the system or process of such contaminants. As more fully illustrated in FIG. 2, the nitrogen cycle comprises supplying pure nitrogen to the bottom of the bin and aspirating the contaminants from the top of the bin. The nitrogen travels upwardly through the bin and through the flakes, and in so doing, the nitrogen lowers the partial pressure within the system and permits the contaminants to vaporize whereby the acetaldehyde, ethylene glycol, and hydrochloric acid (HCl) are effectively extracted and entrained within the nitrogen. The nitrogen supplied or used within the nitrogen cycle may either be continuously supplied pure nitrogen or nitrogen which has been derived from the cycle and purified of the contaminants. If the latter option is chosen, the same nitrogen can of course be reused which renders the process much more economical.

Figure 2:
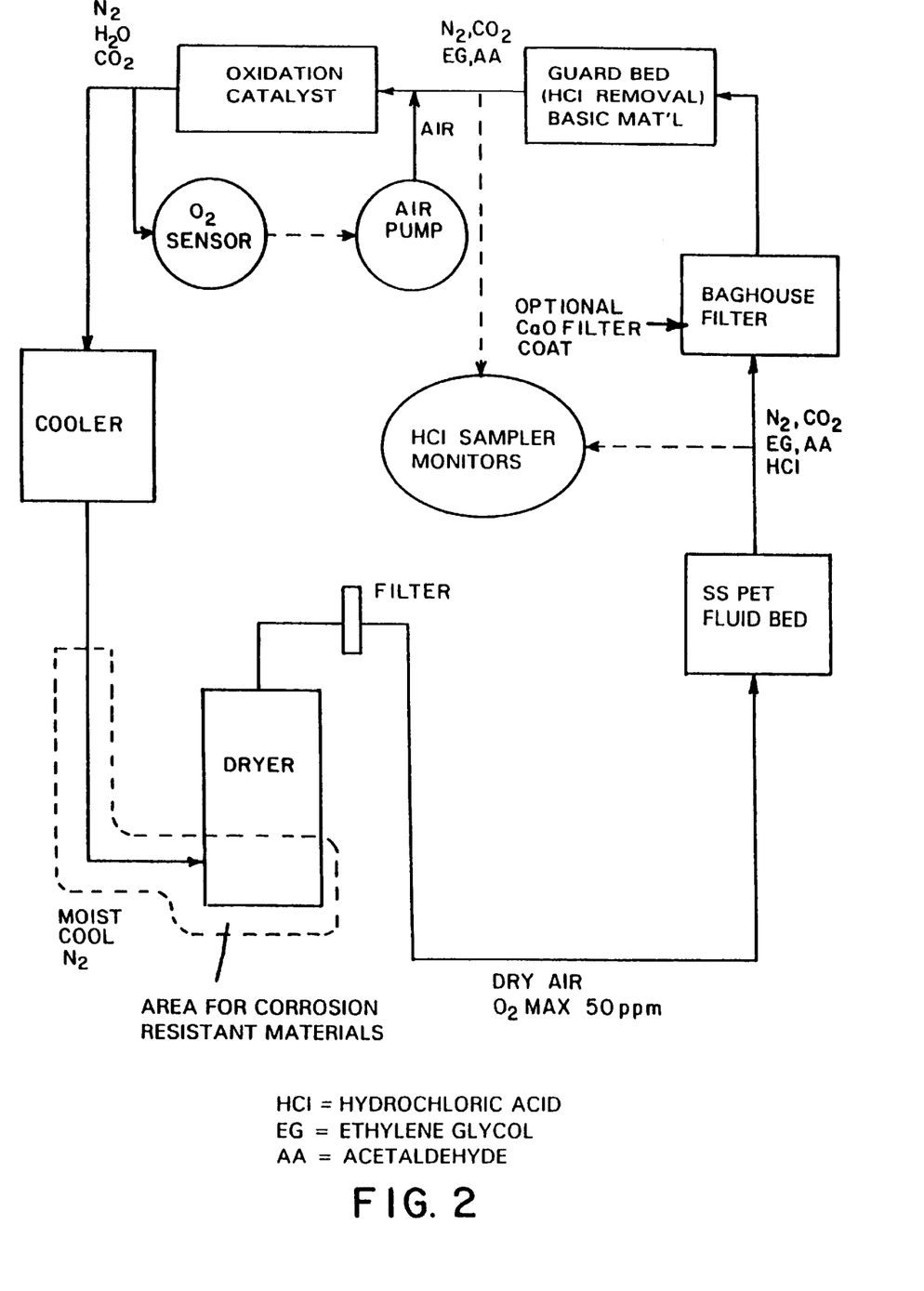
FIG. 2 is a flow chart of a nitrogen cycle portion, of the solid state polymerization (SSP) stage of the process of the present invention, including the use of a guard bed for HCl removal.

The contaminants can be removed from the nitrogen in accordance with any one of several different techniques or processes. One way is through the desiccant process formulated by BEPEX®. Another means is through removal of waste products by the catalytic oxygen process developed by BUHLER®. A still further manner for removing hydrochloric acid (HCl) from the nitrogen cycle is through the use of a lime bag filter apparatus which eliminates the HCl from the flow of gas. Yet another manner in which to remove the HCl from the nitrogen cycle is to conduct the gas through a water spray whereby the HCl is absorbed in the water slurry. A further endeavor may comprise the use of a guard bed of basic material as will be discussed more fully hereinafter.

The removal of the contaminants, and in particular, the removal of the HCl, is important for several reasons. During the second stage of the solid state polymerization, the amount of HCl that is emitted is relatively small, however, the presence of the HCl may nevertheless cause problems within at least two areas or regions of the apparatus and process of the present invention, that is, in connection with catalytic activity, and also in connection with corrosion, especially when liquid water is or may also be present. HCl is known to deactivate a platinum catalyst, although the amount of such deactivation, as might be encountered during practice of the present invention process, is not precisely known. Increased temperature can offset some of the catalyst deactivation but at an increased risk of sintering, that is, permanent deactivation, of the catalyst. Increasing the size of the catalyst bed is also an option for offsetting lower catalyst activity, however, this option increases catalyst costs, drops the pressure within the system, and may require additional blower capacity. In connection with the corrosion problems, liquid water tends to absorb HCl from the passing gas stream and concentrate the same to levels where corrosion rates become problematic. This condition appears to exist at a location after the condenser which cools the process stream and before the absorbent bed.

In accordance then with various embodiments envisioned by the teachings of the present invention, as more specifically illustrated in FIG. 2, and as noted briefly hereinbefore, the problems of catalytic deactivation and corrosion due to HCl reactions may be eliminated by removing the HCl from the process of the present invention as soon as possible by utilizing a guard bed of basic material. Such a guard bed may be added to the BUHLER® line just before the catalyst bed, or alternatively, may be incorporated within the bag house filter assembly just after the solid state fluidized bed. In accordance with another embodiment, the guard bed may be placed after the bag house filter assembly so as to avoid plugging the same with PET particles. In accordance with still another embodiment, the relatively simpler BEPEX® design omits the catalyst bed, so consequently, the guard bed can be placed immediately after the solid state fluidized bed or in the bag house filter assembly. In accordance with techniques employed in connection with placing the guard bed within the bag house filter assembly, the bag house filter can be coated with a basic solid, such as, for example, calcium oxide, lime, caustic soda, or bicarbonate, so as to neutralize the acid. In this case, the conventional filter bags would be replaced by those of the present invention. Still yet alternatively, the guard bed may also take the form of a spray chamber which sprays water or bicarbonate.

With reference continuing to be made to FIG. 2, suitable monitors may also be incorporated within the processing line or system for detecting the levels of HCl present within the system or the various processing components thereof. The levels of HCl could occasionally rise due to the presence of PVC material within the solid state fluidized bed. A simple HCl monitor can comprise a small fluid stream of known flow rate into a scrubber-bubbler attached to an automated titration unit, and the consumption of bases or basic materials so as to maintain constant pH values would constitute a simple yet direct way to measure HCl levels.

Due to the fact that steel or even stainless steel is likely to corrode at excessive rates when liquid water is in the presence of HCl or $Cl_2$, the apparatus of the present invention may be constructed from alternatively viable construction materials, such as, for example, CPPC, PP, or a steel having a corrosion-resistant coating. The 13x molecular sieves used in the BEPEX® desiccant process are also known to degrade in the presence of acids. Accordingly, a larger bed may have to be used so as to compensate for the lost drying capacity. The deterioration of the sieves may also produce powdered sieves. If this happens, the powder could be carried into the PET production materials and/or accumulate within the lower end of the desiccant vessel and thereby impede gas flow. In order to prevent this from occurring, a section of the production facility or plant could be provided with suitable filters so as to filter out the generated powder materials and thereby prevent PET contamination with the same, and easily accessible access ports could be provided within the bottom regions of the apparatus whereby cleaning of the facility is readily facilitated. In accordance with still another embodiment, the nitrogen may be drenched, as the same passes through the fluidized bed, with by-pass desiccant fumes. In any case, once the nitrogen has been purified of its contaminants by any one of the foregoing processes, the purified nitrogen can be conducted back into the bottom of the bin so as to undergo another nitrogen cycle.

The process can be conducted either as a batch process or as a continuous process. One of the important factors in connection with the process of the present invention is that the nitrogen gas removes volatile polymerization reaction products, including ethylene glycol and other impurities, which can cause undesirable secondary reactions. If, for example, more than twenty parts per million of PVC is still contained within the flakes after the preheater stage, the flakes will produce HCl and degrade the desiccant which is used to purify the nitrogen used in the second stage of the solid state polymerization (SSP) process. As such, the desiccant would have to be replaced more than once per year due to the reactions between the HCl and the desiccant.

As briefly noted hereinabove, after the flakes have passed through the hopper and bin structures of the first and second stages, respectively, of the solid state polymerization process, the flake products are removed from the bin of the second stage of the solid stage polymerization process and directly fed in a hot state to the feed hopper of the extruder from which the high-performance strapping is to be produced. The feeding of the hot flake products or materials directly from the solid state polymerization second stage bin to the strap-producing extruder is economically advantageous in that such processing conserves significant heat within the polymer materials and accordingly reduces the power requirements per pound of polymer to be extruded.

The degree of uniformity of the product resulting from the process of the present invention is surprising in view of the variety and relatively wide range of the intrinsic viscosity (IV) values of the initial materials. In addition, heating and solid state polymerization of the PET flakes proceeds readily, rapidly, and without any substantial problems, such as, for example, agglomeration of the polymers, sticking of the polymers to the processing equipment, or degradation of the polymers, as is often the case with pellets. An unexpected result achieved by means of the process of the present invention is the production of a product which has a relatively high average IV value and which was obtained using materials having a wide range of relatively low initial IV values. Stated alternatively, an initially narrow range of IV values is not in fact required in either the initial materials which will undergo the solid state polymerization process and which will be used to manufacture strapping, or in the final strapping itself so as to obtain high quality, high-performance plastic strapping.

Thus, it may be seen that the solid state polymerization process of the present invention advantageously leads to the production of high-performance strapping in an economically desirable manner from both material flow-through and production downtime points of view, although obviously, many modifications and variations of the present invention are possible in light of the above teachings. For example, the precise operating or procedural parameters of the process of the present invention may be altered somewhat in order to achieve desired intrinsic viscosity (IV) values. Intrinsic viscosity increases with increased amounts of nitrogen gas, with increased temperature levels within the solid state polymerization stages, as well as with increased residence times within the solid state polymerization stages. It has also been determined that preheating the flakes to reaction temperature levels reduces the size of the bin necessary to effect solid state polymerization. In addition, it has been further determined that relatively thin flakes exhibit increased IV values much faster than pellets or relatively thick chunks, and they obtain high IV values, and most significantly or importantly, flakes, unlike pellets or chunks, are most desirable in view of the fact that the flakes do not become sticky or cause agglomeration either in the first or second stage of the solid state polymerization. Oxygen is not added during either the preheat or solid state polymerization stages because the presence of oxygen will degrade and color the polymers, and nitrogen is the preferred gas to be used in the solid state polymerization process because it does not lead to the adverse effects that would be caused by oxygen, and because it is economical and readily available. It is therefore to be understood that within the scope of the appended claims, the present invention may be practiced otherwise than as specifically described herein.

What is claimed as new and desired to be protected by Letters Patent of the United States of America is:

1. A process for making a polyethylene terephthalate (PET) material, comprising the steps of:
   collecting diverse PET material having a wide distribution of intrinsic viscosity (IV) values, primarily within the range of 0.60 to 0.80 dl/g, but as high as 0.90 dl/g, and wherein the difference in said IV values of said collected PET material is at least 0.05 dl/g;
   co-mingling said collected PET material and reforming said co-mingled PET material into a single heterogeneous IV batch mixture of PET material comprised substantially of a plurality of non-uniform flake-like and chunklike pieces; and
   directly subjecting said single heterogeneous IV batch mixture of PET material to solid state polymerization (SSP) so as to form a heterogeneous PET material having an average IV value of at least 0.85 dl/g.

2. The process as set forth in claim 1, wherein:
   said difference in said IV values of said collected PET materials is at least 0.10 dl/g.

3. The process as set forth in claim 1, wherein:
   said formed heterogeneous PET material has an average IV value of at least 0.9 dl/g.

4. The process as set forth in claim 1, wherein:
   said formed heterogeneous PET material has an intrinsic viscosity (IV) value range of 0.90 g/dl to 1.5 d/dl.

5. The process as set forth in claim 1, further comprising the step of:
   further reforming said co-mingled heterogeneous IV mixture of flake-like and chunk-like pieces by refining said chunk-like pieces into flake-like pieces.

6. The process as set forth in claim 5, wherein the step of further reforming said co-mingled heterogeneous IV mixture comprises the step of:
   rolling said heterogeneous IV mixture of flake-like and chunk-like pieces under pressure so as to flatten said chunk-like pieces into flake-like pieces.

7. The process as set forth in claim 1, further comprising the step of:
   identifying any PVC particles, found in said heterogeneous IV mixture of PET material formed during said collecting, co-mingling, and reforming steps, and removing said identified PVC particles, prior to said solid-state polymerization.

8. The process as set forth in claim 7, wherein the step of identifying and removing said PVC particles comprises the steps of:
   heating said reformed heterogeneous IV mixture to a temperature at which said PVC particles turn a brown color; and
   removing substantially all of said brown colored particles from said reformed heterogeneous IV mixture.

9. The process as set forth in claim 1, wherein said solid state polymerization step comprises the steps of:
   incorporating a nitrogen cycle within said solid state polymerization; and
   removing a majority of HCl contaminant, formed during said nitrogen cycle portion of said solid state polymerization step, by passing the nitrogen in said nitrogen cycle, and including said HCl contaminant, through a guard bed of basic material.

10. A process for making a polyethylene terephthalate (PET) material, suitable for use in making a high-performance plastic strap, comprising the steps of:
    collecting diverse PET material having a wide distribution of intrinsic viscosity (IV) values, primarily within the range of 0.60 to 0.80 dl/g, but as high as 0.90 dl/g, and wherein the difference in said IV values of said collected PET material is at least 0.05 dl/g;
    co-mingling said collected PET material and reforming said co-mingled PET material into a single heterogeneous IV batch mixture of PET material comprised substantially of a plurality of non-uniform flake-like and chunk-like pieces; and
    directly subjecting said single heterogeneous IV batch mixture of PET material to solid state polymerization (SSP) so as to form a heterogeneous PET material having an average IV value of at least 0.85 dl/g.

11. The process as set forth in claim 10, wherein:
    said difference in said IV values of said collected PET materials is at least 0.10 dl/g.

12. The process as set forth in claim 10, wherein:
    said formed heterogeneous PET material has an average IV value of at least 0.9 dl/g.

13. The process as set forth in claim 10, wherein:
    said formed heterogeneous PET material has an intrinsic viscosity (IV) value range of 0.90 dl/g to 1.5 dl/g.

14. The process as set forth in claim 10, further comprising the step of:
    further reforming said co-mingled heterogeneous IV mixture of flake-like and chunk-like pieces by refining said chunk-like pieces into flake-like pieces.

15. The process as set forth in claim 14, wherein the step of further reforming said co-mingled heterogeneous IV mixture comprises the step of:
    rolling said heterogeneous IV mixture of flake-like and chunk-like pieces under pressure so as to flatten said chunk-like pieces into flake-like pieces.

16. The process as set forth in claim 10, further comprising the step of:
    identifying any PVC particles, found in said heterogeneous IV mixture of PET material formed during said collecting, co-mingling, and reforming steps, and removing said identified PVC particles, prior to said solid-state polymerization.

17. The process as set forth in claim 16, wherein the step of identifying and removing said PVC particles comprises the steps of:
    heating said reformed heterogeneous IV mixture to a temperature at which said PVC particles turn a brown color; and
    removing substantially all of said brown colored particles from said reformed heterogeneous IV mixture.

18. The process as set forth in claim 10, wherein said solid state polymerization step comprises the steps of:

incorporating a nitrogen cycle within said solid state polymerization; and removing a majority of HCl contaminant, formed during said nitrogen cycle portion of said solid state polymerization step, by passing the nitrogen in said nitrogen cycle, and including said HCl contaminant, through a guard bed of basic material.

19. The process as set forth in claim 10, further comprising the step of:

extruding said solid stated PET material so as to make a high-performance plastic strap.

20. The process as set forth in claim 19, wherein:

said high-performance plastic strap made from said solid stated PET material has an IV value of at least 0.90 dl/g.

* * * * *